Feb. 19, 1935.                R. HERRMANN ET AL                1,991,927
            ELECTRICALLY CONTROLLED SCREW CUTTING MACHINE
                    Filed April 23, 1934    4 Sheets-Sheet 1
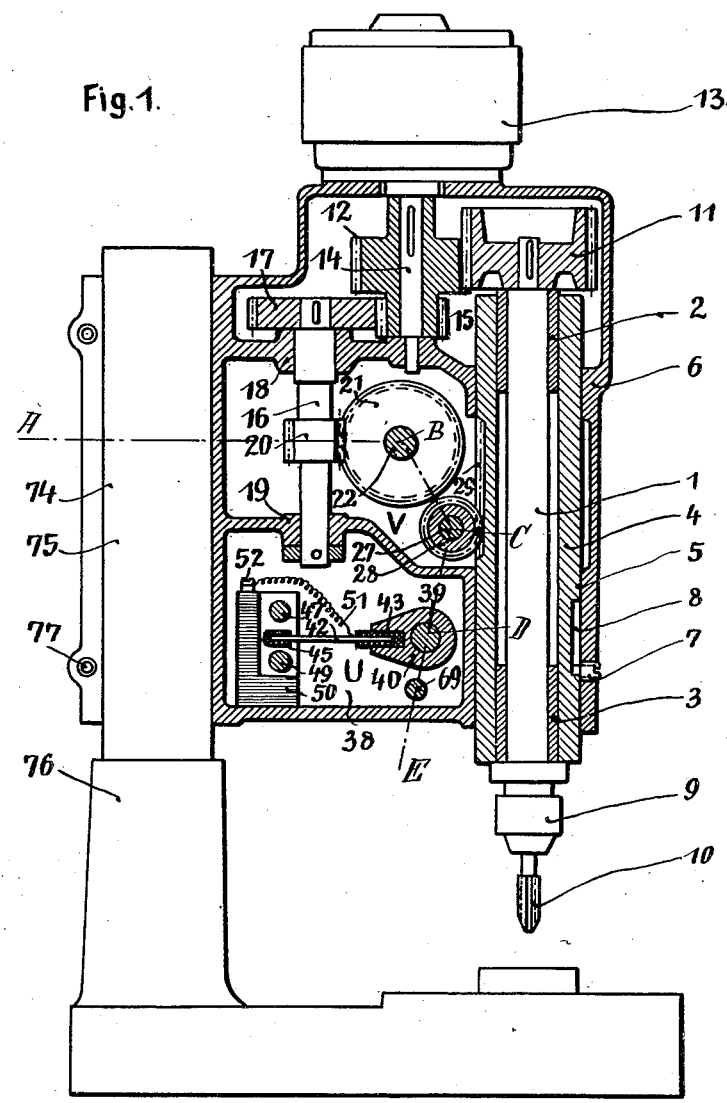
R. Herrmann
E. Herrmann
         INVENTORS
By: Marks & Clerk
        ATTYS.

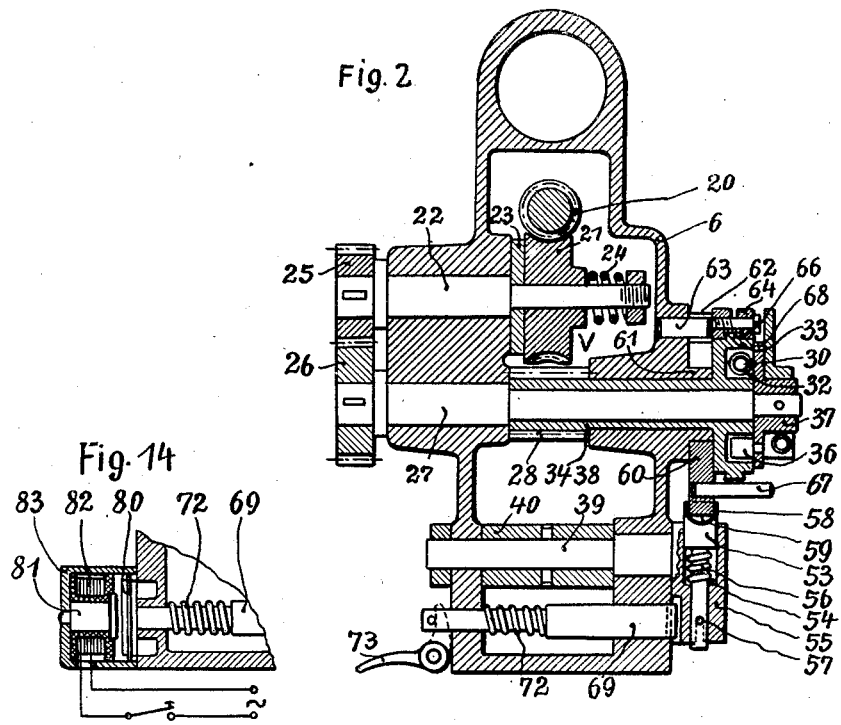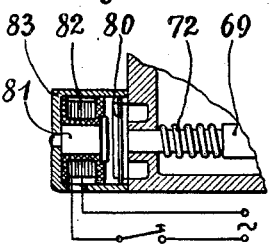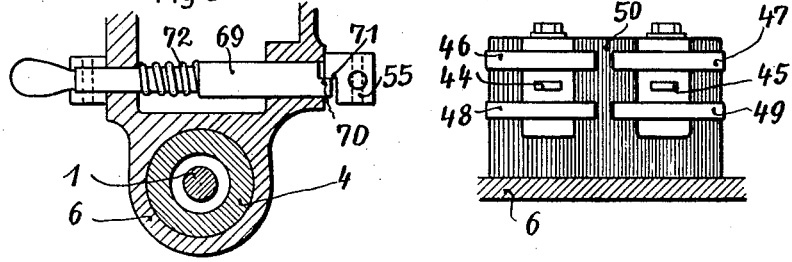

Feb. 19, 1935. R. HERRMANN ET AL 1,991,927
ELECTRICALLY CONTROLLED SCREW CUTTING MACHINE
Filed April 23, 1934 4 Sheets-Sheet 3

R. Herrmann
E. Herrmann
INVENTORS

By: Marks & Clerk
ATTYS

Feb. 19, 1935.    R. HERRMANN ET AL    1,991,927
ELECTRICALLY CONTROLLED SCREW CUTTING MACHINE
Filed April 23, 1934    4 Sheets-Sheet 4

R. Herrmann
E. Herrmann
INVENTORS

UNITED STATES PATENT OFFICE 1,991,927

ELECTRICALLY CONTROLLED SCREW-CUTTING MACHINE

Richard Herrmann and Ernst Herrmann, Stuttgart, Germany

Application April 23, 1934, Serial No. 722,035
In Germany May 8, 1933

7 Claims. (Cl. 10—136)

This invention relates to a screw cutting machine, the axially displaceable spindle of which is rotated in both directions alternately by an electric motor, preferably a three-phase motor, the reversal of the direction of rotation being effected in a manner known in itself by reversing the polarity of the driving motor. This reversal of the direction of rotation is effected in known machines of this kind by means of a magnetically controlled change-over relay, which is reversed by means of suitable control contacts, which are changed over from time to time to the opposite direction of rotation by the axially reciprocating spindle in its end positions. This known arrangement is very complicated owing to the employment of a special change-over relay controlled by a greatly branched auxiliary circuit, and requires expert supervision.

It has now been found that the reversing contacts, such as are employed in magnetically actuated change-over relays, also admit of being entirely mechanically actuated directly by a suitable switching mechanism, which is reversed by the axially displaceable working spindle in the end positions, and that the expensive and very complicated magnetically actuated change-over relay thereby becomes unnecessary, as a result of which a material simplification and cheapening of the machine is attainable, with enhanced reliability of operation.

The length of travel of the working spindle, which is axially displaced by a special feed gear, which may be constructed as a leading screw or, as shown later in the constructional example, as a worm and rack drive, through a distance equal to about the pitch of the thread to be cut at each revolution, is under these circumstances determined, in a manner known in itself, by means of movable reversing stops.

Now it has been found specially advantageous in screw-cutting machines of this type to stop the spindle in the intervals between the individual working periods, partly because the longitudinal movement of the spindle can thereby be restricted to a minimum, but mainly because the supply and removal of workpieces is thereby facilitated and rendered safe. The reversing switch constructed as a quick-break switch is therefore locked in the new machine at the end of each working stroke by a locking device, while it is reversed by the spindle from its forward position to its return position immediately after the quick-break switch has passed beyond its mid position. The switch cannot therefore snap over into the forward position before the detent is retracted. When the reversing switch is released for the purpose of initiating a fresh working stroke, the detent liberates the switch, which now, under the action of the spring-controlled snap device, is thrown over into the forward position. The driving motor, and with it the spindle and the feed gear that displaces them axially, now run forwards, until the spindle has reached its lower limiting position, which is determined by an adjustable reversing stop, which moves in dependence upon the longitudinal displacement of the spindle. This reversing stop now brings the reversing switch into its return position. The driving motor and the spindle now run backwards, until the motor is again reversed into the original position, in which the control switch is again reversed by a second reversing stop to the idle position, out of which it drops into the forward position by release of the aforementioned locking means.

Now a screw-cutting machine of the kind mentioned, in which the spindle is axially displaced by an amount approximately equal to the pitch of the screw at every revolution, must still fulfil the condition that the direction of rotation is reversed after a definite time even if the screw tap should not cut, whether it be that it is accidentally mounted upon an undrilled piece of work, or the cut has become too blunt. In order in this case to prevent injury to the machine there is interposed in a known manner in the path of the power of the feed drive a buffer spring which limits the feeding power to the permissible amount. In order to enable a reversal to be effected at the right time even when this buffer spring responds, according to the invention another auxiliary stop is provided, which is connected with the part of the feed gear preceding the buffer spring. This is so adjusted in relation to the main stop that when the work is proceeding normally it does not come into action. If, however, the spindle is held up, so that it cannot move axially, the auxiliary stop overtakes the main stop towards the conclusion of the stroke, and reverses the direction of rotation after the spindle has executed a predetermined number of revolutions.

One constructional example of the new screw-cutting machine is diagrammatically illustrated in the accompanying drawings, in which Figure 1 shows a longitudinal section through the machine;

Figure 2 shows a section along the line A—B—C—D—E;

Figure 3 is a cross section through the locking means of the reversing switch;

Figure 4 is a sectional elevation through the switch contacts;

Figure 11:
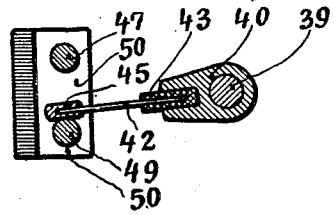
Figure 12:
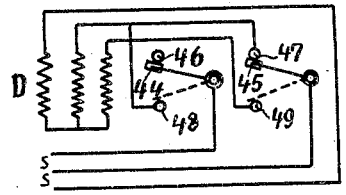
Figure 13:
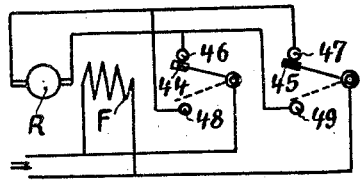

Figure 11 in the backward position;

Figure 12 is a circuit diagram of the machine for three-phase motor drive;

Figure 13 is a circuit diagram of the machine for continuous-current motor drive, and Figure 14 shows a modification.

The spindle 1 of the machine is journalled in bearing bushes 2 and 3 in a bearing sleeve 4, which is guided in a bore 5 in a casing 6. A pin screw 7, which engages in a groove 8 in the bearing sleeve, limits its longitudinal movement and prevents it from rotating. The spindle 1 carries at its lower end a clamping chuck 9 for a screw tap 10. Upon the upper end of the spindle 1 is mounted a toothed wheel 11, which meshes with a toothed wheel 12 mounted upon the shaft 14 of a driving motor 13.

The feed gearing V of the spindle 1 is driven by a pinion 15, which is likewise mounted upon the motor shaft 14. This drives a worm shaft 16 by means of a toothed wheel 17, this worm shaft being journalled in bearings 18 and 19 in the casing 6. The worm 20 meshes with a worm wheel 21, which is rotatably mounted upon a transverse shaft 22, and by the friction disc 23, against which it is pressed by the brake spring 24, and thereby carried round with a limited peripheral power. Upon one end of the transverse shaft 22 is mounted a change wheel 25, which drives a pinion shaft 27 by means of a second change wheel 26. Upon the pinion shaft 27 is mounted loose a pinion 28, which meshes with teeth 29 on the bearing sleeve 4. The pinion shaft 27 and the pinion 28 are rotatably coupled by ring springs 30 and 31, which lie in an annular groove 32 in a stop disc 33, which is connected fast with the pinion 28 by a hollow shaft 34. The ring springs 30 and 31 are located between tappets 35 and 36, one of which is secured to the stop disc 33 and the other to a tappet disc 37, which is fixedly mounted upon the end of the pinion shaft 27. The pinion 28 can therefore only rotate against the action of the buffer spring 30, so that the peripheral force of the pinion 28 in feeding is limited to a definite amount. The shorter and stronger buffer spring 31 is only intended for taking up incidental rotations during the return.

In a cavity 38 in the lower part of the casing 6 is lodged a reversing switch U. Upon its switch shaft 39 is mounted internally a contact arm 40, with which contact springs 41 and 42 are connected by insulating pieces 43. The contact springs 41 and 42 carry at their free ends contacts 44 and 45, which are located between fixed pairs of contacts 46, 47 and 48, 49, which are embedded in an insulating piece 50 connected with the casing 6. The contact springs 41 and 42 are connected by movable conductors 51 with the connection terminals 52.

Figure 5:
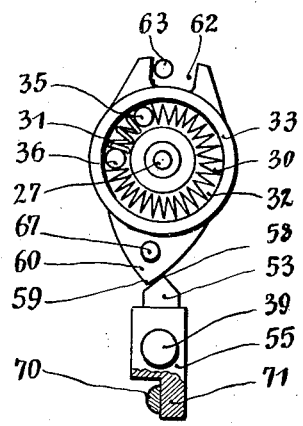
Figure 5 is a cross section through the buffer spring casing, the switching means being shown therein in the locked position.
Figure 6:
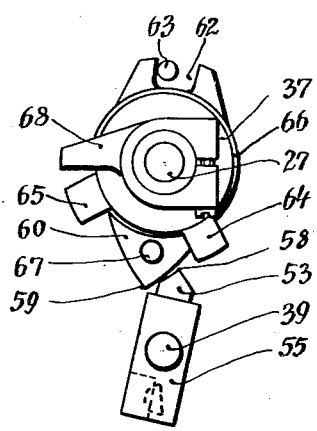
Figure 6 shows the switching means in the forward position.
Figure 7:
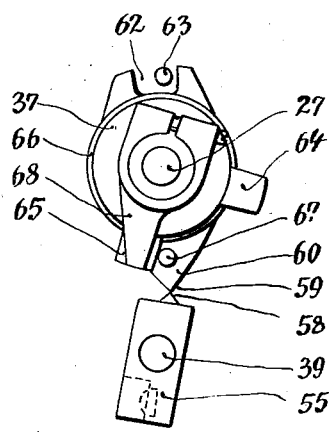
Figure 7 shows the switching means at the moment of snapping over.

The switch shaft 39 is controlled for a quick break by a snap pin 53 (Figs. 2, 5 and 6), which is guided in a transverse bore 54 in a head piece 55 on the switch shaft 39. The snap pin 53 is pressed outwards by a spring 56, and is limited in its movement and prevented from rotating by a pin 57. The snap pin 53 has at its end a knife edge 58, which is opposite to a knife edge 59 on a swing lever 60, which can execute, about a bearing extension 61, a swinging movement which is limited by a notch 62 and a stop pin 63 mounted fast on the casing 6, as shown in Figs. 2, 5 and 7.

Now the swing lever 60 is moved alternately from one extreme position into the other by stops 64 and 65, which are so clamped on to the dovetailed rim 66 of the stop disc 33 as to be adjustable in a peripheral direction. They strike at the end of each forward and backward movement against a tappet pin 67 mounted on the swing lever 60. Upon the neck of the tappet disc 37 is also clamped an auxiliary stop 68, which can likewise come into engagement with the pin 67.

In order to enable the switch shaft 39 to be locked in the mid position, there is arranged parallel to it a locking bolt 69, on the flattened head end 70 of which there strikes a projection 71 on the head piece 55. A compression spring 72 brings the projection into the locked position. It can be retracted by a releasing lever 73 for the purpose of liberating the switch shaft 39.

The casing 6 is mounted by its rear bore 74 upon a column 75 on a table frame 76, and can be firmly clamped at the required height by means of screws 77.

In the position of rest, which is shown in Figure 1, the supply contacts 44 and 45 are located free between the forward contacts 46 and 47 and the return contacts 48 and 49, and the motor 13 is therefore without current. Under these circumstances the switch control assumes the position shown in Figure 5, in which the switch shaft 39 is held fast in the mid position by the locking bolt 69. The snapping pin 53, which is subject to the stress of the compression spring 56, has thrown over the swing lever 60 for right-handed rotation, until it bears with its slot or notch 62 against the stop pin 63, while the switch shaft 39 tends to rotate to the right.

If the locking bolt 69 is drawn back by depressing the releasing lever 73, its extension 70 sets free the extension 71 on the head piece 55, and with it the switch shaft 39. The snap pin 53 now springs forward and swings the switch shaft 39 to the right, until the movable supply contacts 44 and 45 stand upon the forward contacts 46 and 47 respectively. The driving motor 13 now drives the spindle 1 in the forward direction. Under these circumstances the bearing sleeve 4 is displaced forward by the pair of wheels 15 and 17, the pair of change wheels 25 and 26, the pinion 28, and the rack teeth 29 by an amount which is preferably somewhat greater than the pitch of the screw to be cut, and which admits of being regulated by changing the change wheels 25 and 26. Any difference between the pitch of the threads and the actual advance is equalized by the buffer springs 30 and 31.

Figure 8:
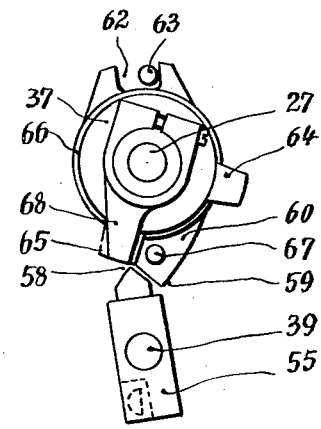
Figure 8 shows the switch in the return position.
Figure 9:
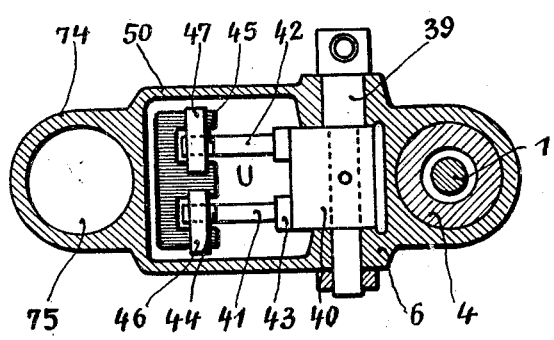
Figure 9 shows the reversing switch in cross section.
Figure 10:
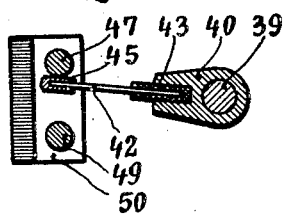
Figure 10 shows the switch contacts in the forward position.

The spindle 1 now runs in a forward direction until the reversing stop 65 takes the cutting lever 60 with it by means of the tappet pin 67. The latter rotates therefore in an anti-clockwise direction until it has reached the position shown in Figure 7. Until then the snap pin 53 has been pressed inwards and the switch shaft 39, owing to its spring stress, has been kept in right-handed rotation, that is to say, in the forward position. Now as soon as the edge 59 of the swing lever 60 has passed the co-acting edge 58 on the snap pin 53, the latter springs forward and throws the swing lever 60 and the switch shaft 39 over into the return position shown in Figure 8. In this position the snap pin 53 tends to rotate the swing lever 60 and the switch shaft 39 in an anti-clockwise direction, until the former again bears with its notch 62 on the stop pin 63 and the movable supply contacts 44 and 45 come into contact with the return contacts 48 and 49. The driving motor is thereby reversed, the screw tap 10 screws out of the work, and the spindle 1 is retracted by the feed gear V into the starting position, which is limited by the stop screw 7. Immediately before this the disconnecting stop 64 moves the knife-edge lever 60 in a clockwise direction, until the switch shaft 39 tends to snap over into the forward position again, but is locked in the mid position by the locking surfaces 70 and 71. The driving motor 13 is therefore again fully switched off and de-energized, and remains stationary after slowing down and stopping. Since it may occur that the driving motor continues to run when the bearing sleeve 4 is already locked in its end position by the stop pin, the feeding worm wheel 21 is rotatably connected by the friction clutch 23 and 24 with the worm shaft 22, for the purpose of obviating over-loading of the feed gear.

If the screw tap 10 is accidentally mounted upon an undrilled portion, or does not cut out, so that the spindle cannot advance, the buffer spring 30 becomes compressed to an extent corresponding to the depth of cut, and the feed pinion 28 located behind it remains stationary. Now since the reversing stop 65 is rigidly connected with the latter by the stop disc 33, this stop cannot reach the tappet pin 67, and therefore cannot reverse the machine. In order to obviate this disadvantage another auxiliary stop 68 is provided, which is connected with the pinion shaft 27, and thereby reverses the motor even if the buffer spring 30 responds to a greater feed path. The two stops 65 and 68 therefore work in such a way that the stop 65 reverses when a definite depth of thread is reached, whereas the auxiliary stop 68 reverses, independently of the position of the spindle 1, after the latter has executed a definite number of revolutions. The auxiliary stop 68 is therefore preferably so adjusted that when the working operation is proceeding normally, it just does not reach the tappet pin 67 when the main stop 65 reverses the motor.

For the driving of such a machine a three-phase motor with a short-circuited rotor is best suited. A circuit diagram of the connections of such a motor is shown in Figure 12. Of the three connection terminals of the motor D, one is directly connected with one of the three leads. The other two are connected crosswise with the contacts 46 and 47 or 48 and 49 respectively, which are connected alternately with the other two leads by the movable lever contacts 44 and 45.

Continuous-current or universal motors also admit of being employed for the drive, and are to be connected according to the circuit diagram of Figure 13. The field F is directly connected with both leads, the two leads of the rotor R are connected crosswise with the contacts 46 and 47 or 48 and 49 respectively, which are connected alternately by the movable lever contacts 44 and 45 with the two leads.

The unlocking of the reversing switch, which is effected in the constructional example hereinbefore described by means of the manual releasing lever 73, may alternatively be effected in some other way. It has been found particularly advantageous to effect this unlocking by the pull of a magnet, as illustrated in Figure 14. By means of this device it is possible to effect the release from any convenient position, without any effort, merely by closing a contact. It is also possible by this means to set a number of such machines in operation simultaneously. In the form of construction illustrated in Fig. 14, there is secured to the rear end of the locking bolt 69 an armature plate 80, which is a short distance from a magnet core 81. Upon the latter is mounted a magnet coil 82, which is surrounded by a cap 83, which forms the external closure of the magnetic flux. When the magnet coil 82 is excited, the magnet core 81 attracts the armature plate 80 as a result of which the locking bolt 69 connected therewith is retracted, and the switch shaft 39 is set free.

What we claim is:—

1. A screw-cutting machine comprising a spindle, a reversible electric motor for rotating the spindle in both directions alternately, a reversing switch for changing the direction of rotation of the motor, a feeding device for displacing the spindle longitudinally, a snap-action mechanism adapted to operate the reversing switch, a reversing stop carried by the feeding device and controlling the snap-action mechanism and a releasable lock adapted to hold the reversing switch open after the snap-action mechanism has been changed over from the backward running position into the forward running position.

2. A screw-cutting machine as claimed in claim 1, wherein the releasable lock comprises a longitudinally movable bar adapted to engage releasably with the reversing switch.

3. A screw-cutting machine comprising a spindle, a reversible electric motor for rotating the spindle in both directions alternately, a reversing switch for changing the direction of rotation of the motor, a feeding device for displacing the spindle longitudinally, a snap-action mechanism adapted to operate the reversing switch, a reversing stop carried by the feeding device and adapted to throw the snap-action mechanism over from a backward running position into a forward running position a releasable lock adapted to hold the reversing switch open after the snap-action mechanism has been changed over from the backward running position into the forward running position, a second reversing stop carried by the feeding device and adapted to throw the snap-action mechanism over from the forward running position into the backward running position when the spindle has reached a definite depth, a buffer spring interposed between the feeding device and the spindle, and an auxiliary reversing stop adapted to throw the snap-action mechanism over from the forward running position into the backward running position after the spindle has executed a definite number of revolutions.

4. A screw-cutting machine as claimed in claim 1, further comprising an electro-magnet for releasing the lock.

5. A screw-cutting machine as claimed in claim 3, the said buffer spring being an annular coil spring.

6. A screw-cutting machine as claimed in claim 3, further comprising a spring casing for the buffer spring, this spring casing also constituting a carrier for the reversing stops.

7. A screw-cutting machine as claimed in claim 3, further comprising a spring casing for the buffer spring, and an overrunning clutch, this spring casing also constituting a carrier for the reversing stops, and its lateral edge constituting a brake disc for the overrunning clutch.

RICHARD HERRMANN.
ERNST HERRMANN.